Nov. 8, 1960     F. J. RUSSELL ET AL     2,959,439
CLOSED RETRACTOR HOUSING

Filed March 2, 1959     2 Sheets-Sheet 1

FRED J. RUSSELL
FRANZ J. NETSCHERT
INVENTORS.

BY Beehler & Shanahan
ATTORNEYS.

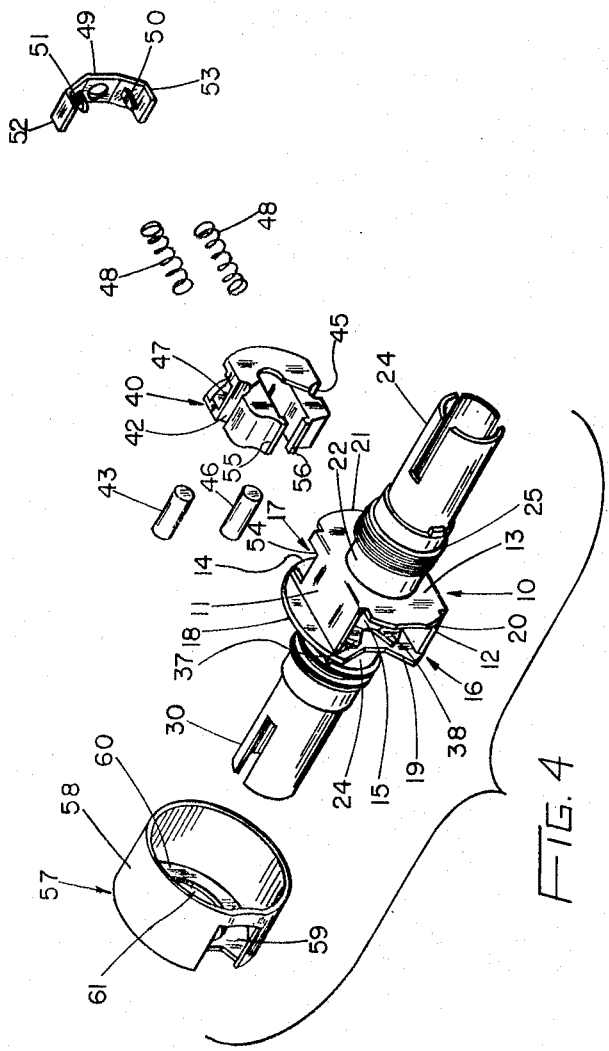

United States Patent Office 2,959,439
Patented Nov. 8, 1960

2,959,439

CLOSED RETRACTOR HOUSING

Fred J. Russell, 2800 Don Felipe Drive, Los Angeles, Calif., and Franz J. Netschert, Glendale, Calif.; said Netschert assignor to said Russell Filed Mar. 2, 1959, Ser. No. 796,612

3 Claims. (Cl. 292—1)

The invention relates generally to door locks and is especially concerned with a housing for a latch bolt retractor so constructed that the separate parts can be conveniently loaded from one side.

During recent years lock sets of a type frequently termed cylindrical case lock sets have become increasingly popular. The cylindrical case type lock sets made reference to are of a compact design and for that reason necessitate relatively little removal of door material in order to place the lock set in operating position. The compactness of these lock sets, however, has generated certain problems in that most working parts need to be confined within a relatively small space, but in such fashion that they are dependable in operation. Because of their design and construction, the industry heretofore has employed the more obvious method of assembly which has consisted of building up the interior of the lock set assembly from one end, that is by fitting the parts successively in place endwise with respect to the axis of the spindles. Because of the number of small parts involved, this manner of assembly has had numerous objections because of the unnecessarily long assembly time involved and the need for greater than ordinary skill in placing and aligning the parts. Also this manner of assembly has the disadvantage of requiring that the retractor housing be closed after, rather than before, the parts are assembled in place.

It is, therefore, among the objects of the invention to provide a new and improved door lock wherein the retractor housing and spindles are completely preassembled into a sub-assembly independently of the latch actuating mechanism, but wherein the retractor housing is so constructed that the actuating parts can thereafter be conveniently inserted into the retractor housing and assembled with the sub-assembly from one side.

Another object of the invention is to provide a new and improved lock set of the cylindrical case type so constructed that the retractor housing is provided with openings at opposite sides in a direction transverse with respect to the spindles so that the retractor slide, springs and other component parts can be conveniently dropped into place through one of the openings and there anchored in position with substantially a minimum expenditure of assembly time.

Still another object of the invention is to provide a new and improved lock set wherein the retractor housing is pre-assembled, thereby to provide a more sturdy construction for the lock set and which, moreover, is constructed to permit a rapid and accurate placing of the operating parts in position in such fashion that persons of moderate skill are capable of completely assembling the device in a relatively short length of time.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:

Figure 4 is an exploded view showing the manner of loading of operating parts into position.

Figure 1:
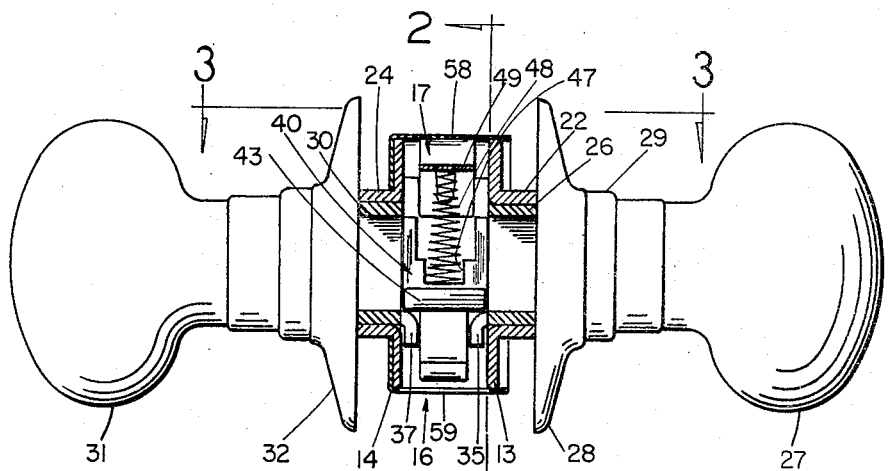
Figure 1 is a longitudinal view of a lock set with the interior operating parts shown in longitudinal section, the parts being assembled as they would appear when in position on a door.

In an embodiment of the invention chosen for the purpose of illustration, there is shown a frame indicated generally by the reference character 10 which is composed of a top wall 11, a bottom wall 12 and side walls 13 and 14. These walls are joined in a manner providing a chamber 15 having an open end 16 on one side and a somewhat similar open end 17 on the opposite side. The side wall 14 is fixed by some appropriate permanent means such as riveting to edges of the top and bottom walls 11 and 12 and has a circumferential rim 18 substantially circular in its form except for a cut-out portion 19. The side wall 13 has opposite arcuate portions 20 and 21, the radius of curvature of which is the same as that of the rim 18.

On the side wall 14 is a hub 22 having threaded portions 23 and 23'. The hub 22 is ordinarily the hub facing what is generally designated as the inner side of the door (not shown) upon which the lock is mounted. Similarly on the opposite side wall 13 there is provided a hub 24 having a threaded portion 25.

Rotatably mounted within the hub 22 is a spindle 26 which at its outer end is provided with a knob 27. Also mounted upon the spindle over the threaded portion 23 is an escutcheon 28 which is normally drawn against the appropriate face of the door (not shown) and tightened in position by rotation upon the threaded portion. A collar 29 is threadedly secured to the threaded portion 23' and overlies the escutcheon 28. Correspondingly, on the opposite side a spindle 30 is rotatably mounted in the hub 24 and has a knob 31 attached to its outer end by substantially conventional means. An escutcheon 32 threadedly mounted upon the threads 25 is adapted to be drawn against the corresponding face of the door.

At the inner end of the spindle 26 there are provided roll-back elements 35 and 36. These roll-back elements correspond to similar roll-back elements 37 and 38 on the spindle 30.

In practice when the lock is assembled, the spindles are initially mounted in the respective hubs after which the side wall 14 is permanently secured to the top and bottom walls 11 and 12 so that the spindles, hubs and frame comprise a sub-assembly. The frame of the sub-assembly, as previously described, has the openings 16 and 17 initially formed therein.

Additional operating parts which cooperate with the spindles and roll-back elements comprise a retractor slide 40 of special design in that it includes an upper face 41 containing a laterally open arcuate recess 42 in which is mounted a cylindrical roller 43. Opposite the upper face is a lower face 44 provided with a similar laterally open arcuate recess 45 immediately opposite the recess 42 and in which is rotatably mounted a roller 46.

At one end of the retractor slide are pockets 47, one located on each side, each of which contains an inner end of a coiled compression spring 48. The springs are retained in the pockets by action of a spring keeper member 49 having tabs 50 and 51 which enter outer ends of the springs 48 and hold them in proper position when the spring keeper member is anchored in position.

To secure the spring keeper member in its proper location, the member is provided with flaps 52 and 53 so located and of such size that they extend outwardly through slots 54 in the top and bottom walls 11 and 12, respectively, of the frame and overlie the walls thereby to secure the spring keeper member in place. At the opposite end of the retractor slide 40 are retention flanges 55 and 56 which are adapted to engage a substantially conventional latch bolt (not shown) so that when the slide is reciprocated, the latch bolt can be actuated.

When the retractor slide and its associated parts are to be assembled, the frame 10, sub-assembled as described, is laid upon a suitable work fixture with the opening 17 facing upwardly. The retractor slide is then inserted into the opening a short distance and the rollers 43 and 44 are inserted in the corresponding recesses 42 and 45 whereupon the retractor slide together with the rollers is dropped into the chamber 15. During this portion of the operation, the spindles are rotated to such position that the roll-back elements 35 and 36 on the one spindle and 37 and 38 on the other spindle are in the positions shown in Figure 2 so that the rollers will fall against them when the slide is pushed into position.

Figure 2:
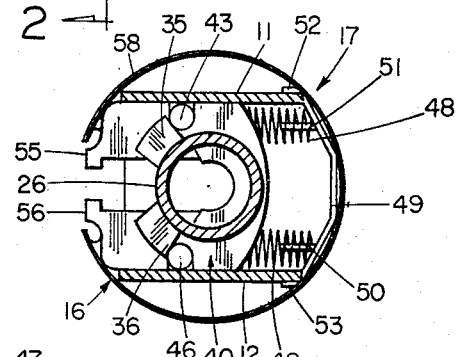
Figure 2 is a cross-sectional view taken on the line 2—2 of Figure 1.
Figure 3:
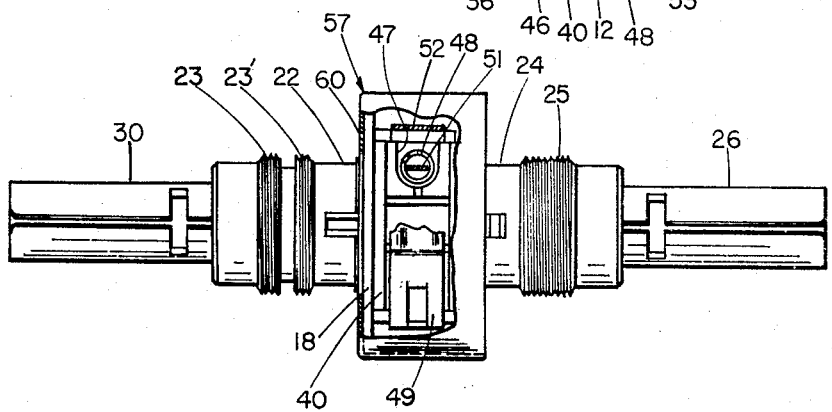
Figure 3 is a top view of the device as shown in Figure 1 partly broken away.

After the retractor slide and the rollers have been pressed into the relative positions shown in Figures 1 and 2, the springs 48 are dropped into the pockets 47 and the spring keeper member 49 is then placed in position. This is accomplished by first inserting the tabs 50 and 51 into the outer ends of the springs, after which the keeper member is pressed into position with the flaps 52 and 53 overlying the top and bottom walls 11 and 12 as previously indicated. The relative sizes of the slots 54 and the flaps may be such that there is provided a snug friction fit sufficient to hold the spring keeper member in position until a housing 57 is placed in position overlying the rim 18 and the arcuate portions 20 and 21.

It will be noted that the housing has a substantially cylindrical wall 58 which entirely overlies the spring keeper member when assembled, but which is provided with an opening 59 on the side immediately opposite which is in a position corresponding to the location of the open end 16. A side wall 60 of the housing has an opening 61 therein which overlies the hub 24.

By providing the housing 57 with a snug friction fit upon the appropriate portions of the frame, the housing will be retained in position once the lock is assembled. It will further be clear that on those occasions where it might be necessary to separate the lock, this can be readily accomplished by merely removing the housing whereupon there is immediate access to the spring keeper member which can be lifted from position and thereby permit extraction of the retractor slide and its appropriate components.

Constructed as shown to permit side loading, the frame can be made especially rugged and completely preassembled and furthermore is such that because of the side approach loading technique, the retractor slide and its components can be quickly dropped in position without the aid of fixtures and also by employment of mechanical means which can perform the operation in virtually a minimum amount of assembled time.

Although we have herein shown and described our invention in what we have conceived to be the most practical and preferred embodiment, it is recognized that departures may be made therefrom within the scope of our invention, which is not to be limited to the details disclosed herein, but is to be accorded the full scope of the claims so as to embrace any and all equivalent structures and devices.

Having described our invention, what we claim as new and desire to secure by Letters Patent is:

1. A lock structure comprising a frame having a slide chamber therein, said slide chamber having an open loading end and an open working end opposite said loading end, spindles rotatably mounted respectively in opposite sides of said frame and a roll-back means on each spindle in the chamber adjacent the respective side, a latch bolt retractor slide, said open loading end having an unobstructed opening of cross-sectional area greater than the cross-sectional area of said slide, said slide being receivable into said chamber through said open loading end in a position wherein said slide is in engagement with said roll-back means, said slide having at an end thereof adjacent said loading end a spring keeper, spring means engageable with said keeper through said open loading end, and a separate spring keeper member insertable into the opening of said open loading end into position wherein the keeper member is in engagement with said spring means whereby to anchor said spring means in position.

2. A lock structure comprising a frame having opposite side walls fixed in an assembled relationship and forming a slide chamber therebetween, said slide chamber having upper and lower walls and having an open loading end and an open working end opposite said loading end, spindles rotatably mounted respectively in said opposite sides and having an upper and lower roll-back element in the chamber adjacent the respective side wall, a latch bolt actuating slide having opposite faces, said open loading end having an opening of cross-sectional size greater than the cross-sectional size of the slide, said slide being receivable in said chamber through the opening in said open loading end into a position wherein said slide is in engagement with said roll-back elements, said slide having at an end thereof adjacent said loading end a spring receiving recess, coiled springs receivable in opposite sides of said recess through said open loading end, and a spring keeper member insertable into the opening in said open loading end into position wherein the keeper member is in engagement with said springs whereby to anchor said springs in position.

3. A lock structure comprising a frame having opposite parallel side walls and opposite parallel upper and lower walls fixed in an assembled relationship and forming a slide chamber therebetween, said chamber having a laterally opening loading end and an open working end opposite said loading end, spindles rotatably mounted respectively in said opposite side walls, upper and lower roll-back elements on each spindle in the chamber adjacent the respective side wall, a latch bolt actuating slide having opposite parallel upper and lower faces spaced from each other a distance less than the distance between said opposite parallel upper and lower walls, said loading end having an unobstructed opening greater in cross sectional area than the cross sectional area of said slide, said slide being receivable in said chamber through the opening of said open loading end into a position wherein said slide is in engagement with said roll-back elements, said slide having at an end thereof adjacent said loading end when in assembled position, spring receiving recesses, coiled springs receivable in said recesses through said open loading end, and a spring keeper member having keeper means thereon, said keeper member being insertable through said open loading end into position wherein the keeper means are in engagement with said springs whereby to anchor said springs in position, and a housing movable to a position in engagement with said spring keeper member and a portion of said frame whereby to secure said spring keeper member in place.

References Cited in the file of this patent
UNITED STATES PATENTS

| | | |
|---|---|---|
| 2,297,077 | Schlage | Sept. 29, 1942 |
| 2,800,351 | Schmid | July 23, 1957 |
| 2,836,452 | Kubik et al. | May 27, 1958 |